W. H. MATTSON.

Improvement in Roses for Door-Knobs.

No. 126,642.  Patented May 14, 1872.

Witnesses.
J. Snowden Bell.
Wm. B. Dayton.

Inventor.
W. Harry Mattson.

UNITED STATES PATENT OFFICE.

W. HARRY MATTSON, OF PHILADELPHIA, PENNSYLVANIA.

IMPROVEMENT IN ROSES FOR DOOR-KNOBS.

Specification forming part of Letters Patent No. 126,642, dated May 14, 1872.

*To all whom it may concern:*

Be it known that I, W. HARRY MATTSON, of the city and county of Philadelphia, in the State of Pennsylvania, have invented a certain new and useful Improvement in Attachments for Door-Knobs, of which improvement the following is a specification:

The object of my invention is to provide a simple and substantial bearing for the knob-shank and a convenient and effectual means of securing the rose, and, further, to prevent the loosening of the socket and rose by the movements of the knob, which is a constant source of annoyance and expense in arrangements heretofore in use. My improvement consists in the combination of a back plate provided with an externally-threaded socket, in which the knob-shank bears, and a thimble, which screws on the threaded socket and clamps the rose firmly in position, as hereinafter more fully set forth.

Figure 1:
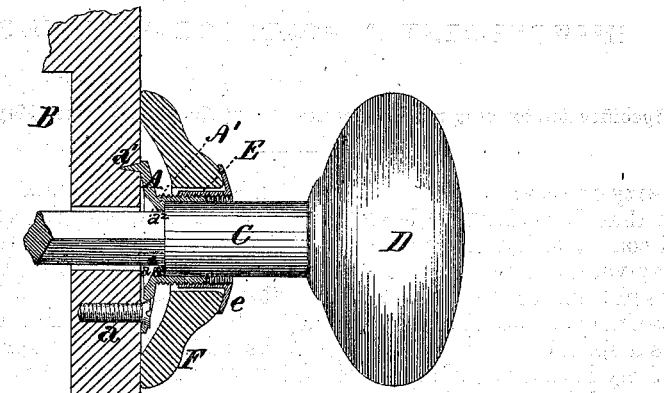
Figure 2:
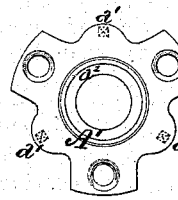
Figure 3:
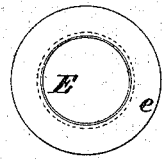
Figure 4:

In the accompanying drawing, Figure 1 is a sectional view of my improvement in position upon a door; Fig. 2, a plan or top view of the back-plate; Fig. 3, a similar view of the thimble; and Fig. 4, a side view of the thimble.

The back plate A is firmly secured in the required position upon the door B by screws $a$ and prongs $a^1$. This plate is provided with a central socket, A', having a screw-thread cut upon its outer surface, in which socket the shank C of the knob D has its bearing. An interior collar or abutment, $a^2$, is cast upon the socket A', against which the end of the cylindrical portion of the knob-shank abuts, and the knob-shank is thereby maintained in proper position longitudinally. A cylindrical thimble, E, provided with a flange, $e$, and having a thread cut on its inner surface, is screwed upon the socket A', and serves to secure the rose F upon the door by clamping it between the same and flange $e$.

By reference to Fig. 1 of the drawing it will be seen that my improvement satisfactorily attains the object of my invention. The bearing of the knob-shank is securely fastened to the door, and the attachment of the rose is simple and efficient. Moreover, each of these parts is entirely exempt from liability to become loosened by the movements of the knob, and the rose can be removed and replaced without interfering with the bearing of the knob-shank.

I am aware that a back plate having a projecting socket upon which the rose is to be screwed has been heretofore known, and do not therefore claim such device.

What I claim as my invention, and desire to secure by Letters Patent, is—

The combination of a back plate for a knob-rose provided with an externally-threaded socket, in which the cylindrical portion of the knob-shank has its bearing, and an internal collar or abutment forming an end-bearing for the same, with a thimble which screws upon the socket out of contact with the knob-shank and holds the rose in position, these parts being constructed and arranged as herein set forth.

W. HARRY MATTSON.

Witnesses:
J. SNOWDEN BELL,
WM. B. DAYTON.